United States Patent [19]

Minamida

[11] Patent Number: 4,544,818
[45] Date of Patent: Oct. 1, 1985

[54] COOKING UTENSIL FOR INDUCTION COOKING APPARATUS

[75] Inventor: Ataru Minamida, Saitama, Japan

[73] Assignee: Asahi Giken Kogyo Kabushiki Kaisha, Tokyo, Japan

[21] Appl. No.: 585,295

[22] Filed: Mar. 1, 1984

Related U.S. Application Data

[63] Continuation-in-part of Ser. No. 402,849, Jul. 29, 1982.

[30] Foreign Application Priority Data

| Apr. 13, 1983 [JP] | Japan | 58-55095[U] |
| Apr. 28, 1983 [JP] | Japan | 58-65596[U] |
| Apr. 28, 1983 [JP] | Japan | 58-65595[U] |

[51] Int. Cl.$^4$ .................................. H05B 6/12
[52] U.S. Cl. ........................ 219/10.49 R; 219/10.67; 126/390
[58] Field of Search ............. 219/10.49 R, 10.79, 219/10.67; 126/390; 220/454, 455; 428/653, 926, 928, 931; 99/DIG. 14

[56] References Cited

U.S. PATENT DOCUMENTS

| 888,960 | 5/1908 | Clark | 126/390 X |
| 2,151,535 | 3/1939 | Scurlock | 126/390 |
| 2,618,258 | 11/1952 | Kroyer | 126/390 |
| 3,788,513 | 1/1974 | Racz | 126/390 X |
| 3,966,426 | 6/1976 | McCoy et al. | 219/10.49 R |

FOREIGN PATENT DOCUMENTS

| 109512 | 1/1940 | Australia | 126/390 |
| 674003 | 3/1939 | Fed. Rep. of Germany | 126/390 |
| 561766 | 6/1944 | United Kingdom | 126/390 |

*Primary Examiner*—Philip H. Leung
*Attorney, Agent, or Firm*—Stefan J. Klauber

[57] ABSTRACT

This is a cooking utensil suitable for electromagnetic induction heating cooking apparatus. The cooking utensil is made firmly integral between an aluminum container body and an iron flame-sprayed layer by flame-spraying an iron layer which is a magnetic layer at least on the outer surface of the bottom of the container of aluminum or aluminum alloy in a manner to make corresponding portions of such iron layer penetrate into plural inclined grooves which have been formed on the outer surface of the bottom in advance, thereby enabling to utilize otherwise unsuitable aluminum material for the cooking utensil.

11 Claims, 7 Drawing Figures

COOKING UTENSIL FOR INDUCTION COOKING APPARATUS

This appication is a continuation-in-part of my co-pending application Ser. No. 402,849, filed July 29, 1982.

BACKGROUND OF THE INVENTION

The present invention relates to a cooking utensil developed for electromagnetic induction cooking and, more particularly to a cooking utensil for use with a high frequency induction heating cooking apparatus.

DESCRIPTION OF THE PRIOR ART

Various cooking utensils such as pots, frying pans, etc. have been used for boiling, cooking or broiling materials with fire flame. There has recently been proposed a cooking apparatus of electromagnetic induction heating system wherein electric current flows from a power source to magnetic force generating coils to generate magnetic lines of force on the surface of a top plate so as to make pots or pans placed on the plate exothermic, thereby enabling to cook with the heat. The popularity such system has gained is attributable to such advantages that, unlike conventional gas rings or ranges, there is no need to worry about fire as it does not use fire nor burn gas, air in the room can be kept clean and fresh and the bottom of the utensils can be kept clean without scorch. However, cooking utensils usable in such a system are inconveniently limited to those of magnetic materials such as iron-enameled pots, iron frying-pans, 18Cr-stainless pots and iron-plates and alminum pots or other utensils of non-magnetic materials can not be used. This poses a problem as an ordinary iron-enameled pot is too heavy to be easily handled when used in the electromagnetic induction cooking system, iron frying pans are unsuitable for broiling as they tend to be overheated locally, or those types of utensils cannot stand cooking for long sustained hours at a high temperature. Such utensils are also defective as they are easily rusted.

Accordingly, the inventor of this invention proposed a cooking utensil wherein magnetic material is combined with an aluminum body and more particularly, a cooking utensil wherein magnetic material layers are provided at least on the outer surface of the bottom of an aluminum or aluminum alloy utensil body, thereby providing a utensil suitable for cooking as well as broiling by the electromagnetic cooking device of high frequency induction heating system. (U.S. patent application Ser. No. 402,849, now abandoned).

SUMMARY OF THE INVENTION

The present invention is the result of further improvement of the abovementioned previous proposal and aims at providing a cooking utensil which has an extremely high integration between a magnetic material and an aluminum or an aluminum alloy body of the utensil by forming plural sloped grooves on the outer surface of the bottom of a utensil in advance before providing the aluminum or aluminum alloy body at least on the outer surface of the bottom thereof with iron layers by means of flame spraying which are magnetic, and combining the layers with the bottom in a manner to penetrate corresponding portions of the iron layers into respective groves.

Another object of the present invention is to provide a cooking utensil which can achieve a high integration despite iron layers of different heat expansion coefficient are sprayed on the body of aluminum or aluminum alloy, and which can be stable despite that the bottom is repeatedly subjected to expansion/contraction. Such object is attained by making the centre portion of the bottom curved toward inner side thereof from the periphery in flame-spraying iron in layers.

The above and other objects, benefits, features and uses will become more apparent as the description proceeds referring to the attached drawings.

BRIEF DESCRIPTION OF THE PREFERRED EMBODIMENTS

Figure 1:
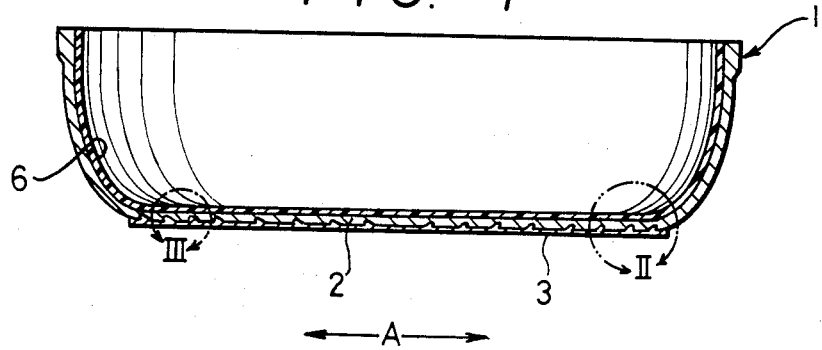
FIG. 1 is a vertical cross section of an embodiment of a cooking utensil according to the present invention.
Figure 2:
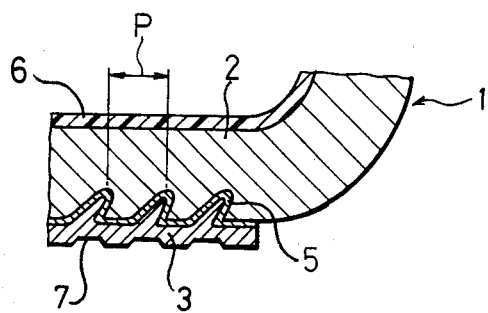
FIG. 2 is an enlarged cross section of FIG. 1 along the arrow II.
Figure 3:
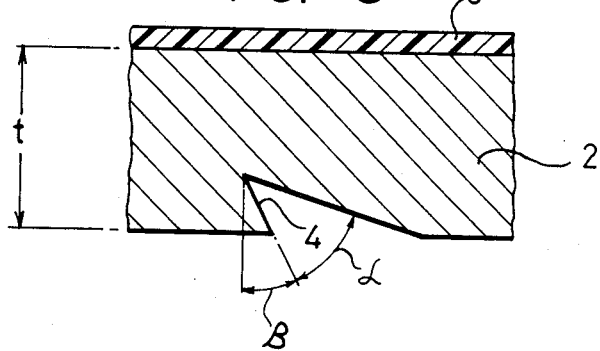
FIG. 3 is a partially enlarged cross section of the part corresponding to the one marked by the arrow III in FIG. 1 to show the state wherein grooves are provided on the outer surface of the bottom before magnetic layers are provided thereon.

The present invention will now be described referring to attached drawings. FIGS. 1 through 3 show an embodiment of this invention. In the embodiment shown in the figures, applicable cooking utensils are represented by a pot wherein the reference numeral 1 denotes a body of the pot made of aluminum or aluminum alloy and iron layers 3 are flame sprayed as a magnetic material on the outer surface of the bottom 2 of the body 1. The iron flame sprayed layer 3 is formed at least on the outside of the bottom 2 of the body 1 and is formed in a manner to penetrate into plural inclined grooves 4 which have been formed beforehand. The grooves 4 are arrange in the direction from the center of the outer surface of bottom 2 toward outside thereof (in the direction shown by the arrow A in FIG. 1) with a notched angle $\alpha$ of 15° to 45° and, therefore, can be notched on the outer surface of the bottom 2 in a plural number in concentric circles. Before flame-spraying iron layers 3 on such a bottom 2 of the body 1, the outer surface of the bottom 2 is treated with blasting to roughen the surface, is formed with flame-sprayed layer of nickel, nickel chrome or SUS group of 0.2 mm or less in thickness as an intermediate layer 5 for oxidation prevention, and then is formed with flame-sprayed layer of iron 3 of 0.8 mm to 1 mm in thickness. When material is flame sprayed on the bottom 2 of the body 1, it can penetrate deeply into the plural grooves 4 which have been formed extending outward in inclination, thereby enabling to integrate the intermediate sprayed layer 5 and the iron sprayed layer 3 with the bottom 2.

Although the inclination angle β in the plural grooves 4 depends on the thickness of the bottom 2, it is preferably ca. 30° if the thickness t of the bottom 2 is 2 to 5 mm and the notched angle of the groove 4 if formed preferably ca. 45°. Various experiments proved that the pitch P between grooves 4, 4 is preferably 5 to 10 mm. The reference numeral 6 in the figure denotes a processed layer on the inner side such as processed alumite layer or a coating layer of Teflon(registered trademark).

In the cooking utensil shown in FIGS. 1 through 3, as described hereinabove, as at least the outer surface of bottom 2 of the body 1 is provided with plural grooves 4 in inclination in advance, treated with an intermediate layer 5 for oxidation prevention, and then provided with a flame-sprayed layer of iron 3 as a magnetic material, the portions corresponding to the plural grooves 4 can be formed in a manner to partially penetrate the grooves 4, thereby achieving a solid and firm integration with the bottom 2. In other words, the iron layer 3 can be wedged into the bottom 2 of the aluminum or aluminum alloy pot body 1. This "wedge effect" prevents the iron sprayed layer 3 from peeling from the bottom and guarantees a solid integration of the layer with the pot body 1 for a long period of time even though there is difference in thermal expansion coefficient between the pot body 1 and the iron sprayed layer 3. The pot according to the invention is advantageous in design as the bottom 2 of the pot body 1 is patterned with the iron sprayed layer 3 penetrating partially into corresponding grooves 4, in concave pattern 7. When such plural inclined grooves 4 are formed to achieve such a wedge effect as well as an interesting pattern in design, size, inclination β, notched angle β, pitch p, the total pattern in a plane of the grooves 4 can be arbitrarily selected to meet the size, form and other conditions of the pot body 1.

Figure 4:
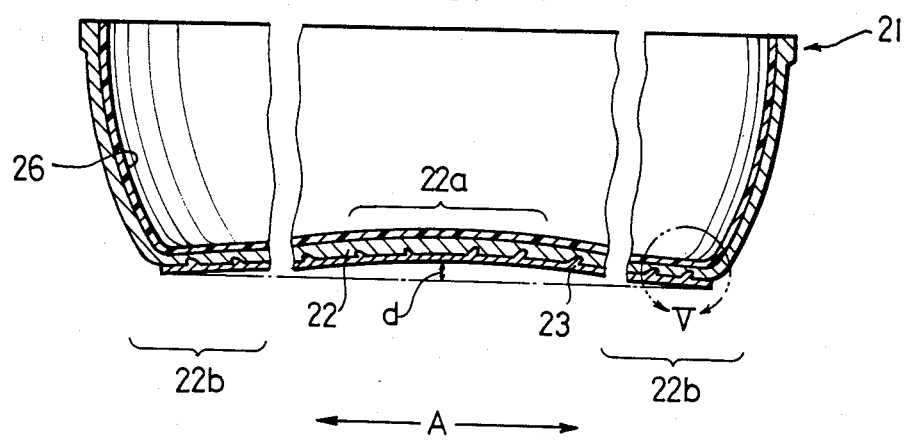
FIG. 4 is a vertical cross section to show another embodiment of this invention.
Figure 5:
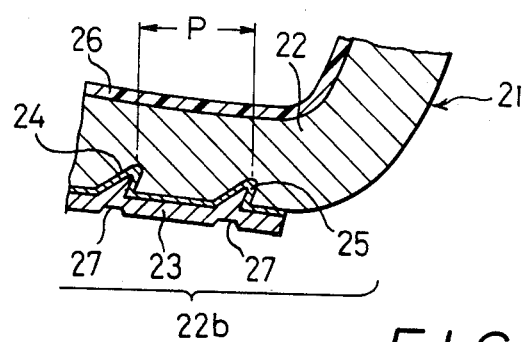
FIG. 5 is an enlarged cross section of the part along the arrow mark V shown in FIG. 4.

Referring now to FIGS. 4 and 5, another embodiment of this invention will be explained. In the figure, a pot is illustrated as the cooking utensil wherein the reference numeral 21 denotes a pot body of aluminum or aluminum alloy and the center portion 22a of the bottom 22 thereof is curved toward inside of the pot from the periphery portion 22b to a certain extent. Although the depth d of the convex depends on the size of the bottom area 22, it may be ca. 3 mm for a sauce-pan 20 cm in diameter. The bottom 22 can be curved in the above way by utilizing the blast force generated when iron is flame sprayed on the surface in order to provide the "magnetic material layer" on the outer face of the bottom 22 and the state of the pot body 21 which has been softened by the heat generated by such spraying. The iron layer 23 is flame sprayed at least on the outer surface of the bottom 22 of the pot body 1 and yet is formed in a manner to penetrate the plural inclined grooves 24 which have been formed beforehand. When materials are sprayed onto the bottom 22 of the pot body 21, the intermediate layer 25 and the iron layer 23 are formed integrally with the bottom 22 in a manner to penetrate the plural inclined grooves 24 which have been formed to extend toward outside. The iron layer 23 when flame sprayed, goes into the plural grooves 24 at a predetermined spray speed. The bottom 22 of aluminum or aluminum alloy is heated by the flame spray and then subjected to the blasting force thereof, thereby making the pot body 21 curved into inside to a certain extent. If flame spraying is repeated from the periphery 22b of the bottom 22 toward the center thereof 22a, a predetermined beautiful curved pattern will be obtained. The reference numeral 26 denotes the layer of inner processing while 27 concave patterns.

The cooking utensil shown in FIGS. 4 and 5 becomes extremely stable as the bottom 22 is slightly curved inside on the center thereof 22a from the periphery thereof 22b when an iron layer 23 which is flame-sprayed to form a beautiful pattern. There is no problem in electromagnetic induction even if the center portion 22a of the bottom 22 is curved inside from the periphery 22b and heating by electromagnetic induction can be fully and effectively achieved. On the other hand, if the center 22a of the bottom 22 is made curved toward outside or made convex from the periphery 22b, the periphery portion thereof would not be placed smoothly or stably on a flat plane to affect electromagnetic induction as well as thermal efficiency.

As the structure and performance of this embodiment are substantially identical with those described for the embodiment shown in FIGS. 1 through 3, further description is omitted to avoid duplication.

Another embodiment of this invention is explained referring to FIGS. 6 and 7 hereinbelow.

When an iron layer is flame sprayed on the bottom 32 of a pot body 31 which has been provided with plural inclined grooves 34, the outer side of the bottom 32 is first blast-processed to roughen the same, the surface is then formed with an intermediate layer 35 of nickel, nickel chrome or SUS group in the thickness of 0.2 mm or less for preventing oxidation, an iron layer 33 is flame sprayed on the surface 0.5 mm to 1 mm in thickness, the surface is further impregnated with anti-rust agent, and finally the surface is formed with a rust prevention layer 38 (20 to 50μ in thickness) to finish the process.

As the heat-resistant anti-rust agent mentioned above, chemical substances having alkali metalic salt of silicate as an inorganic binder and the principal component, a polyvalent metalic salt oxide [such as zinc oxide or aluminum phosphate] as a hardening agent, a pigment and additives may be used. For instance, "Sumicerum-P" manufactured by Sumitomo Chemical Inductries Co. may be used.

The anti-rust agent of the above composition has a thermal resistance to ca. 600° C. and cooking utensils generally require the thermal resistance to ca. 200° at most. If the above mentioned agent is utilized for the rust-prevention layer 38, therefore, it will improve the corrosion resistance of the cooking utensil and especially that of the flame sprayed layers.

The impregnation of the rust-prevention agent and the formation of the rust prevention layer 38 on the iron layer 33 can be conducted extremely simply in a relatively short time by simply spraying the agent against the iron layer 33 at a normal temperature. Then, if the layer is thermally treated at a low temperature of 300° or less, the anti-rust agent 39 impregnated in the laver 33 will be hardened in closed pores and at the same time the rust prevention layer 38 on the layer 33 will be hardened, thereby forming a rust prevention layer 38 of a hardness higher than that of enamel. The reference numeral 36 in the figure denotes an inner processed layer and 37 concave patterns.

As described hereinabove, the embodiment shown in FIGS. 5 and 6 has various advantages. As the layer 33 which has been sprayed on the bottom 32 is coated with the rust prevention layer 38, the layer 33 becomes fully resistant against corrosion which otherwise is caused by liquid used in cooking. As the rust prevention agent 39 is impregnated in pores of the layer 33 when the layer 38 is being formed, the pores are effectively sealed. Therefore, the amount or the size of pores does not have to be taken into account excessively when conditions for flame spray including materials are selected. This will advantageously provide a wider choice in selection. As the anti-rust layer 38 which is formed on the outermost surface has a greater hardness which is more than that of enamel, it will become an optimal protective layer.

Description about other structure and performance will be omitted as they are substantially identical to the one given for the embodiment shown in FIGS. 1 through 3.

The description will now be given to the effect. The cooking utensil described above according to this invention is capable of securely forming an iron flame-sprayed layer upon a body of the utensil of aluminum or aluminum alloy having different thermal expansion coefficient, and of providing a magnetic layer of an improved integration, thereby achieving an extremely superior performance as a cooking utensil for electro-magnetic induction heating system. As the bottom of the utensil body is provided with plural grooves in advance on the outer surface thereof and in an inclined form, if iron is flame sprayed thereon to form a magnetic material layer, a portion of the sprayed iron can go into the grooves to make the iron layer penetrate securely and simply into the aluminum or aluminum alloy body in a "wedge-like" fashion. The mechanical strength will be enhanced. As the iron can be flame-sprayed partially into the plural grooves formed on the outer surface of the bottom, patterns can be formed to thereby greatly enhancing the design as a cooking utensil.

As shown in FIGS. 4 and 5, the cooking utensil according to this invention is advantageous in that the utensil is extremly stable as the bottom thereof is curved in toward the center from the periphery, the curved portion can effectively absorb deformation even if the bottom is deformed due to expansion/contraction while in use. This will prevent the bottom from protruding toward outside and guarantee the stable position of the utensil.

Figure 6:
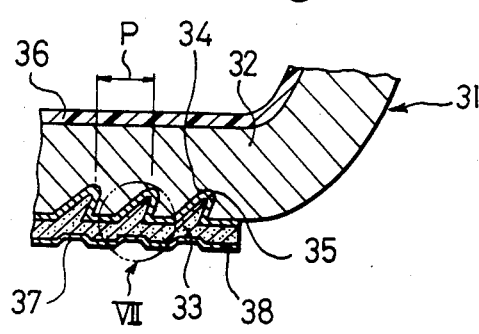
FIG. 6 is an enlarged cross section of still another embodiment corresponding to FIG. 2.
Figure 7:
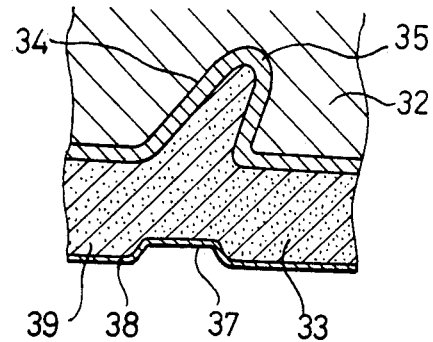
FIG. 7 is a partially enlarged cross section of the part along the arrow mark VII of FIG. 6 to show the state where the outer surface of the bottom is penetrated with magnetic material in the grooves thereof and is provided with rust-proof material layers.

As illustrated in FIGS. 6 and 7, iron sprayed layer can be protected from corrosion as a rust prevention material of thermal resistance type is coated on the layer. This will further prevents the flame-sprayed layer from exfoliation, thereby advantageously enabling to prolong the life of a cooking utensil for the electromagnetic induction heating system.

I claim:

1. A cooking utensil for electromagnetic induction cooking apparatus of the type wherein an iron layer is flame-sprayed on the outer surface of the bottom of a container body of aluminum or aluminum alloy, which is characterized in that said flame-sprayed iron layer is made integral to the bottom in a manner such that corresponding portions of said layer are wedged into a plurality of concentric grooves which have been pre-formed on the outer surface of said bottom, the said grooves being each defined by converging walls which each incline away from the axis of said utensil; the included angle between the said converging walls being from 15° to 45°.

2. The cooking utensil as claimed in claim 1 which is characterized in that an intermediate layer is flame-sprayed into said grooves for oxidation prevention and then the outer surface thereof is flame-sprayed with iron.

3. The cooking utensil as claimed in claim 1 or 2 which is characterized in that the outer surface of the flame-sprayed layer is curved from the periphery of the said bottom of the container toward the center; and wherein said flame sprayed layer is recessed at the surface portions thereof overlying said grooves to thereby define concave patterns on the bottom of said container.

4. the cooking utensil as claimed in claim 1 which is characterized in that the flame-sprayed iron layer is meade integral to the bottom in a manner to have corresponding poprtions thereof penetrate into the plural inclined grooves which have been formed on the outer surface of the bottom in advance and that said flame-sprayed layer is coated with a thermal resistant rust prevention layer.

5. The cooking utensil as claimed in claim 4 which is characterized in that an intermediate layer is flame sprayed into the plural inclined grooves for oxidation prevention and an iron layer is flame-sprayed on the outer surface thereof.

6. The cooking utensil as claimed in claim 4 or 5 which is characterized in that the outer surface of the rust prevention layer is curved and the bottom is formed with concave patterns.

7. A cooking utensil for electromagnetic induction cooking apparatus of the type wherein an iron layer is flame-sprayed on the outer surface of the bottom of a container body of aluminum or aluminum alloy, which is characterized in that said flame-sprayed iron layer is made integral to the bottom in a manner such that corresponding portions of said layer are wedged into a plurality of concentric grooves which have been pre-formed on the outer surface of said bottom, the said grooves being each defined by converging walls which each incline away from the axis of said utensil; the flame-sprayed iron layer being made integral to the bottom so that corresponding portions penetrate into the plural inclined grooves which have been formed on the outer surface of the bottom, and the center portion of said bottom being curved inwardly toward the inner-side of the container body from the periphery thereof.

8. A cooking utensil for electromagnetic induction cooking apparatus of the type wherein an iron layer is flame-sprayed on the outer surface of the bottom of a container body of aluminum or aluminum alloy, which is characterized in that said flame-sprayed iron layer is made integral to the bottom in a manner such that corresponding portions of said layer are wedged into a plurality of concentric grooves which have been pre-formed on the outer surface of said bottom, the said grooves being each defined by converging walls which each incline away from the axis of said utensil; the flame-sprayed iron layer being made integral to the bottom so that corresponding portions penetrate into the plural inclined grooves which have been formed on the outer surface of the bottom; and an intermediate flame-sprayed layer being provided in said grooves for oxidation prevention, the outer surface thereof being sprayed with iron.

9. The cooking utensil as claimed in claim 8 which is characterized in that an intermediate layer is flame sprayed into the plural inclined grooves for oxidation prevention and an iron layer is flame sprayed on the outer surface thereof.

10. The cooking utensil as claimed in claim 8 which is characterized in that the outer surface of the flame-sprayed layer is curved upwardly from the periphery of the said bottom of the container toward the center; and wherein said flame-sprayed layer is recessed at the surface portions overlying said grooves to define concave patterns.

11. A cooking utensil for electromagnetic induction cooking apparatus of the type wherein an iron layer is flame-sprayed on the outer surface of the bottom of a container body of aluminum or aluminum alloy, which is characterized in that said flame-sprayed iron layer is made integral to the bottom in a manner that corresponding portions of said layer are wedged into a plurality of concentric grooves which have been preformed on the outer surface of said bottom, the said grooves being each defined by converging walls which each incline away from the axis of said utensil; the flame-sprayed iron layer being made integral to the bottom so that corresponding portions penetrate into the plural inclined grooves which have been formed on the outer surface of the bottom; the center portion of said bottom being curved inwardly toward the innerside of the container body from the periphery thereof; and the flame-sprayed layer being coated with a thermal resistant rust prevention layer.

* * * * *

UNITED STATES PATENT OFFICE
CERTIFICATE OF CORRECTION

Patent No. 4,544,818　　　　　　　　Dated October 1, 1985

Inventor(s) Ataru Minamida

It is certified that error appears in the above-identified patent and that said Letters Patent are hereby corrected as shown below:

Column 6, line 12; "meade" should read -- made --.

Signed and Sealed this

First Day of July 1986

[SEAL]

Attest:

DONALD J. QUIGG

Attesting Officer　　　Commissioner of Patents and Trademarks